United States Patent
Sagong et al.

(10) Patent No.: US 9,571,217 B2
(45) Date of Patent: Feb. 14, 2017

(54) METHOD AND APPARATUS FOR DETECTING INTER-CELL INTERFERENCE IN MOBILE COMMUNICATION SYSTEM

(71) Applicant: Samsung Electronics Co., Ltd., Suwon-si (KR)

(72) Inventors: Min Sagong, Suwon-si (KR); Sungnam Hong, Anyang-si (KR); Taeyoung Kim, Seoul (KR); Jiyun Seol, Seongnam-si (KR)

(73) Assignee: SAMSUNG ELECTRONICS CO., LTD, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/921,830

(22) Filed: Oct. 23, 2015

(65) Prior Publication Data
US 2016/0119071 A1    Apr. 28, 2016

(30) Foreign Application Priority Data
Oct. 24, 2014    (KR) ........................ 10-2014-0144674

(51) Int. Cl.
*H04B 1/00* (2006.01)
*H04B 15/00* (2006.01)
(Continued)

(52) U.S. Cl.
CPC ............ *H04J 11/005* (2013.01); *H04L 5/0032* (2013.01); *H04L 5/0051* (2013.01); *H04L 5/0073* (2013.01); *H04L 1/20* (2013.01)

(58) Field of Classification Search
CPC ...... H04L 1/20; H04L 25/0228; H04L 5/0073; H04L 7/0626; H04L 7/0639; H04B 7/0456; H04B 17/345; H04B 1/1027; H04B 7/0619; H04W 24/00; H04W 72/08; H04J 11/005
(Continued)

(56) References Cited

U.S. PATENT DOCUMENTS

2010/0099423 A1    4/2010  Ogawa et al.
2010/0195700 A1    8/2010  Ogawa et al.
(Continued)

FOREIGN PATENT DOCUMENTS

WO    WO 2014/003514 A1    1/2014

OTHER PUBLICATIONS

International Search Report dated Mar. 31, 2016 in connection with International Application No. PCT/KR2015/011284, 5 pages.

*Primary Examiner* — Olumide T Ajibade Akonai

(57) ABSTRACT

A method and an apparatus for detecting inter-cell interference in a mobile communication system are provided. A base station receives a reference signal (RS) from a terminal, generate one or more interference candidate RSs, calculate a cross correlation of the one or more interference candidate RSs and the received RS, estimate at least one of a size of a Resource Block (RB) an offset of the RB, a group index (U), and a cyclic shift (CS) by using a preset number of interference candidate RSs in an order of the large cross correlation. The base station further removes an interference signal or performs a direct reduction by using at least one of the estimated RB size, the RB offset, the timing offset, and the group index (U). According to the present disclosure, it is beneficial to mitigate or cancel inter-cell interference problem on an uplink transmission without any assistance of neighbor base stations and/or adjacent cells in a wireless communication system.

26 Claims, 13 Drawing Sheets

(51) Int. Cl.
*H04J 11/00* (2006.01)
*H04L 5/00* (2006.01)
*H04L 1/20* (2006.01)

(58) Field of Classification Search
USPC .......................................................... 455/63.1
See application file for complete search history.

(56) References Cited

U.S. PATENT DOCUMENTS

| | | |
|---|---|---|
| 2011/0183692 A1 | 7/2011 | Lee et al. |
| 2011/0189951 A1 | 8/2011 | Noh et al. |
| 2014/0078912 A1* | 3/2014 | Park ..................... H04L 5/0048 370/252 |
| 2014/0098773 A1 | 4/2014 | Yoo et al. |
| 2014/0286269 A1* | 9/2014 | Stanwood ............. H04W 24/02 370/329 |
| 2015/0111592 A1 | 4/2015 | Chang et al. |

* cited by examiner

FIG. 3
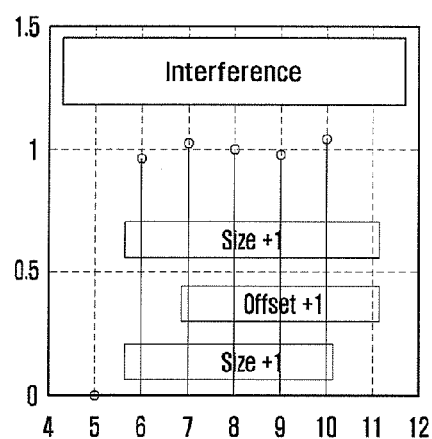
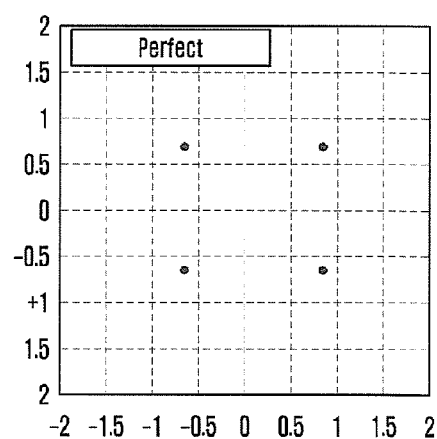
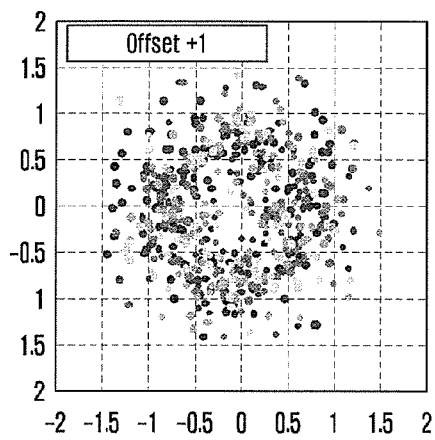
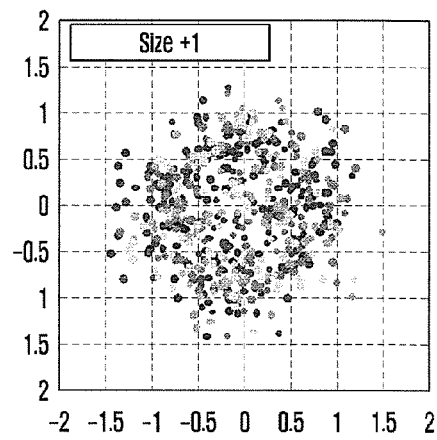

FIG. 8

METHOD AND APPARATUS FOR DETECTING INTER-CELL INTERFERENCE IN MOBILE COMMUNICATION SYSTEM

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2014-0144674, filed on Oct. 24, 2014, which is hereby incorporated by reference for all purposes as if fully set forth herein.

TECHNICAL FIELD

The present disclosure relates generally to a method and an apparatus for detecting inter-cell interference in a mobile communication system.

BACKGROUND

An inter-cell interference (ICI) reduction technique has been evolved in a wireless communication system. For example, an indirect interference rejection and combining (IRC) technique uses information derived from a target user equipment (UE) in lieu of ICI information that is measured between cells or devices to cancel and/or mitigate interferences. Accordingly, the indirect IRC technique requires lower implementation complexity and overhead information, but the indirect IRC technique may not guarantee a higher performance. Conversely, a direct IRC technique may provide a higher performance gain than an indirect IRC technique because the direct IRC technique directly uses ICI information that is received from neighbor base stations and/or adjacent cells or blindly detected in order to mitigate or cancel interferences. In addition, the direct IRC technique adopts a decoding and/or a demodulation technique to mitigate or cancel interferences. Accordingly, the direct IRC technique may require a larger amount of information than the indirect IRC technique to provide a higher performance gain. For example, the direct IRC technique that is defined in the long term evolution (LTE) specification may require resource blocks (RBs) information, interference modulation information, and a cell identification (ID) information for a demodulation operation, and code rate information for a decoding operation in order to mitigate or cancel interferences. Accordingly, an interference reduction technique not requiring larger amount of overhead but providing a higher performance gain is needed to cancel and/or mitigate inter-cell interference in a wireless communication system.

SUMMARY

To address the above-discussed deficiencies, it is a primary object to provide a direct IRC or an Interference Cancellation (IC) method based on blind Inter-Cell Interference (ICI) sensing in the LTE uplink, and an apparatus thereof.

In one embodiment, a method for communicating by a base station is provided. In this example, the method includes receiving a reference signal transmitted from a terminal, generating one or more interference candidate RSs, calculating a cross-correlation value of the one or more interference candidate RSs and the received RS, and estimating at least one of resource block (RB) sizes, an RB offset of the RB, a group index (U), a timing offset, and a cyclic shift (CS) in accordance with a preset number of interference candidate RSs in an order of a large-cross correlation value. The RB is regarded as an interference originator. The method further includes performing a direct reduction in accordance with the one or more estimated RB sizes, the RB offset of the RB, the group index (U), the timing offset, and the cyclic shift (CS) and removing the interference in accordance with the direct reduction. An apparatus for performing this method is also provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an example estimation diagram of a resource block size and location according to the present disclosure;

FIG. 8 illustrates an example configuration of a reverse auto-correlation according to the present disclosure;

DETAILED DESCRIPTION

Figure 1:
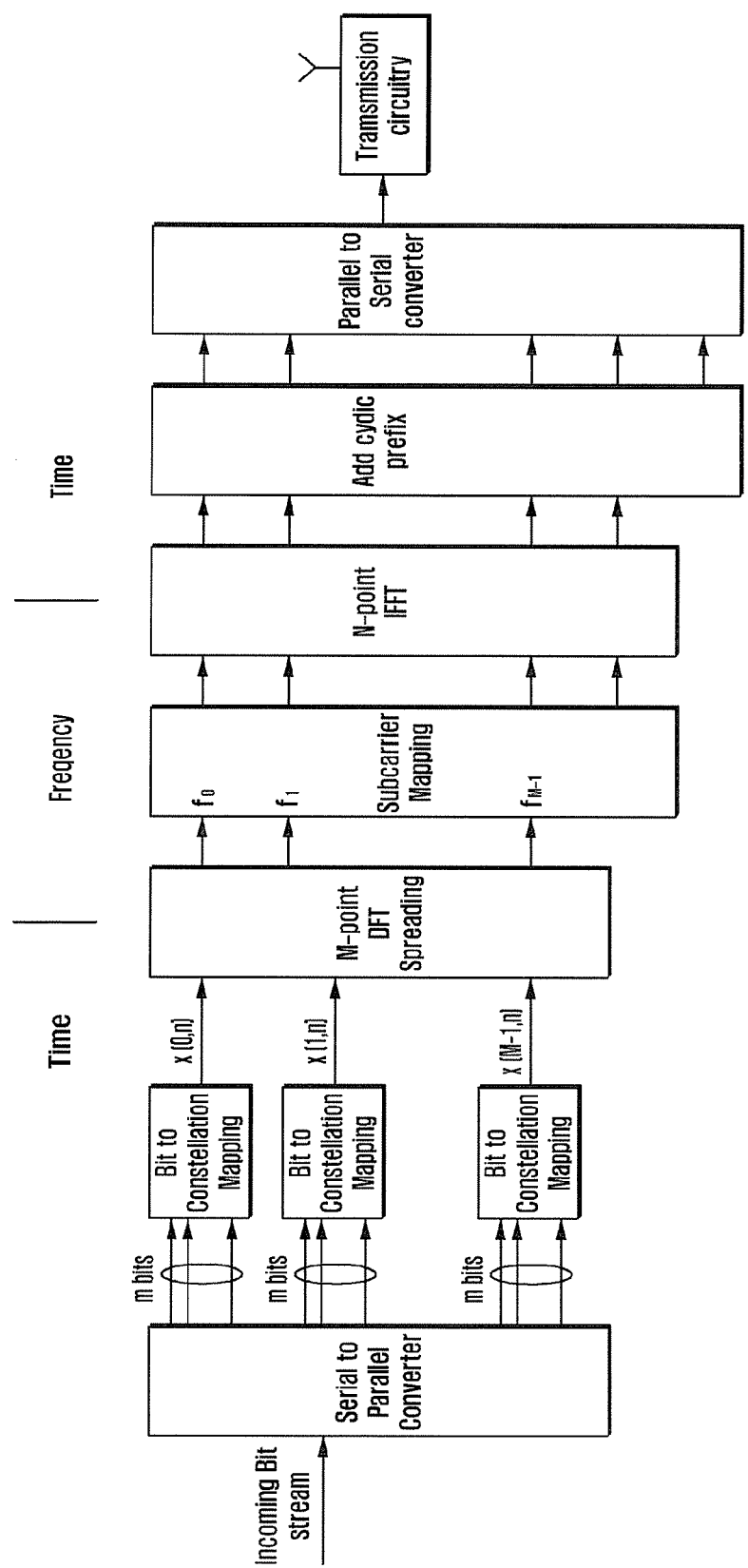
FIG. 1 illustrates an example block diagram for an uplink transmission according to the present disclosure.

FIGS. 1 through 13, discussed below, and the various embodiments used to describe the principles of the present disclosure in this patent document are by way of illustration only and should not be construed in any way to limit the scope of the disclosure. hose skilled in the art will understand that the principles of the present disclosure may be implemented in any suitably arranged electronic device. Hereinafter, embodiments of the present disclosure are described in detail with reference to the accompanying drawings.

In describing embodiments of the present disclosure, a description of technical details that are well-known in the art to which embodiments of the present disclosure pertains and are not directly associated with embodiments of the present disclosure will be omitted. Such an omission of unnecessary descriptions is intended to more clearly provide the gist of embodiments of the present disclosure without making the gist obscure.

In the following description of embodiments of the present disclosure, a detailed description of known functions or configurations incorporated herein will be omitted when it is determined that the detailed description may unnecessarily obscure the subject matter of embodiments of the present disclosure. Hereinafter, embodiments of the present disclosure will be described with reference to the accompanying drawings. The terms which will be described below are terms defined in consideration of the functions in the present disclosure, and may be different according to users, intentions of the users, or customs. Therefore, the definitions of the terms should be determined based on the contents throughout the specification. Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device can be a device including a communication function. For example, an electronic device can include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (such as a head-mounted-device (HMD) such as electronic glasses, an electronic clothing, an electronic bracelet, an electronic necklace, an electronic accessory, an electronic tattoo, or a smartwatch).

According to certain embodiments, an electronic device can be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., such as SAMSUNG HOMESYNC™, APPLE TV™, GOOGLETV™, or the like), game consoles, an electronic dictionary, an electronic key, a camcorder, or an electronic frame.

According to certain embodiments, an electronic device can include at least one of various medical devices (such as Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (such as a navigation device for a ship, a gyro compass, etc.), an avionics, a security device, or a robot for an industrial use or a home use.

According to certain embodiments, an electronic device can include at least one of a furniture or a portion of a building/structure including a communication function, an electronic board, an electronic signature receiving device, a projector, or various measurement devices (such as waterworks, electricity, gas, or radio wave measuring device, etc.). An electronic device can be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1 illustrates an example block diagram for an uplink transmission according to the present disclosure. An incoming bit stream is transmitted to a terminal through a serial-to-parallel converter, a bit to constellation mapping module, an m-point discrete fourier transform (DFT) spreading module, a subcarrier mapping module, an N-point inverse fast fourier transform (IFFT) module, a cyclic prefix adding module, a parallel-to-serial converter, and a transmission circuitry.

Figure 2:
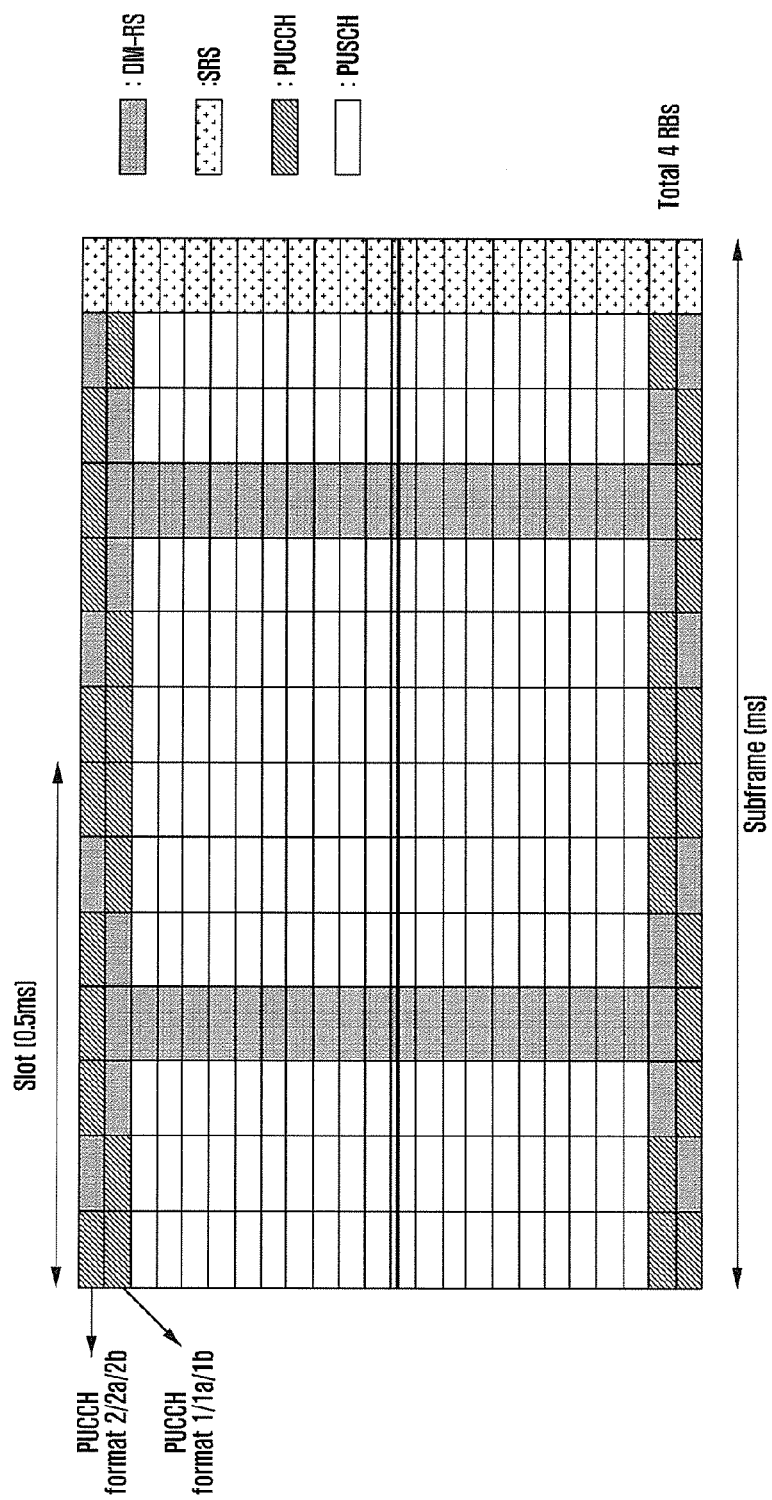
FIG. 2 illustrates an example structure of a long-term evolution (LTE) uplink demodulation reference signal (DMRS) according to the present disclosure.

FIG. 2 illustrates an example structure of a long-term evolution (LTE) uplink demodulation reference signal (DMRS) according to the present disclosure. The DMRS is transmitted in each resource block (RB) allocated to a terminal over a physical uplink control channel (PUCCH) and a physical uplink shared channel (PUSCH).

Figure 4:
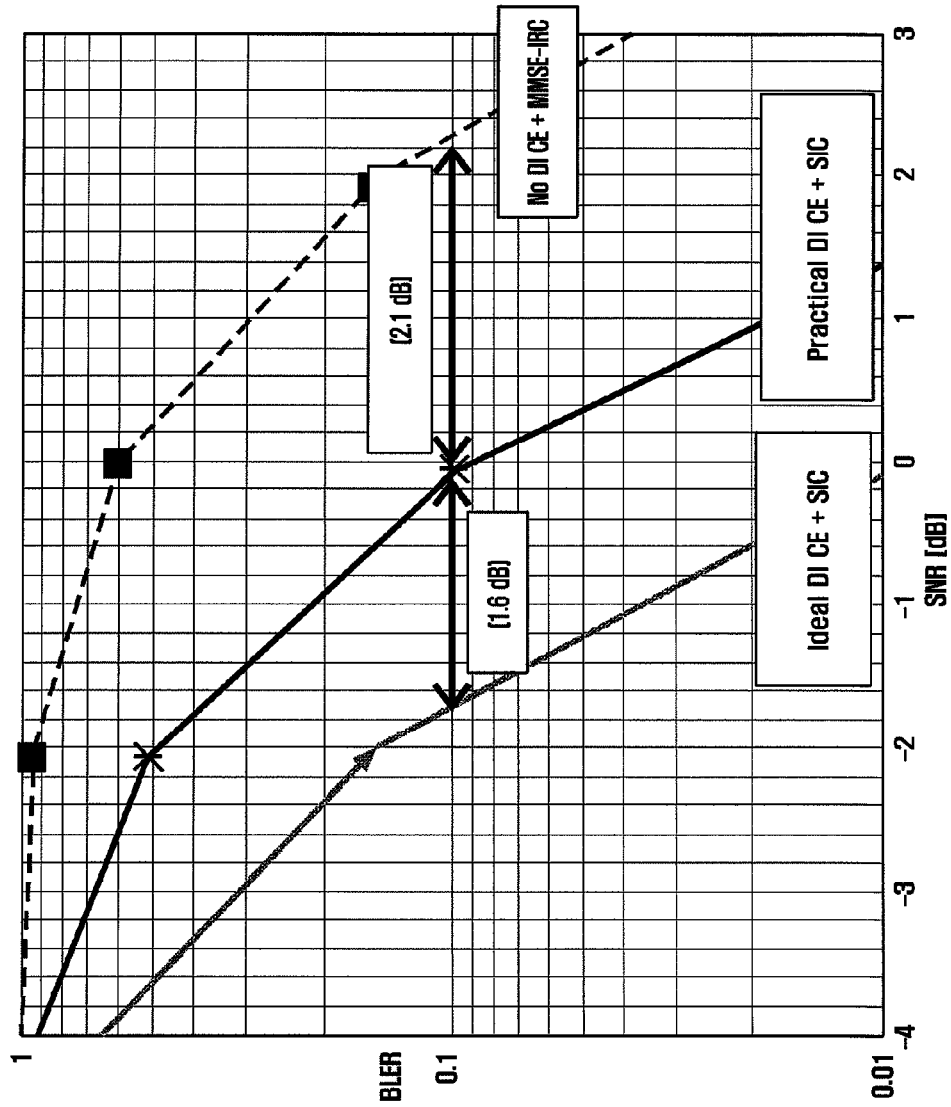
FIG. 4 illustrates an example channel estimation diagram according to the present disclosure.

FIG. 3 illustrates an example estimation diagram of a resource block size and location according to the present disclosure. And FIG. 4 illustrates an example channel estimation diagram according to the present disclosure.

According to the present disclosure, blind inter-cell interference (ICI) sensing (BIS) refers to estimate a number of dominant interferences (DIs), a size and location of a resource block (RB) used by the DIs, and a demodulation reference signal (DM-RS) parameter of the DIs without any assistance of a base station (or evolved Node B: eNB).

In estimation of the RB size and location of the DIs, if the estimation of at least one RB has a problem, the demodulation of the DI is not possible. For example, as illustrated in FIG. 3, if one offset of the RB or one size of the RB has a problem, the demodulation of the DI is not possible.

Furthermore, a reason for performing channel estimation (CE) of DIs is that, when channel estimation has an error, successive interference cancellation (SIC) gains is not obtained. For example, as illustrated in FIG. 4, a signal to noise ratio (SNR) is varied according to a channel estimation. Accordingly, when the channel estimation is not performed, desired direct IRC or SIC gains is not obtained.

Figure 5:
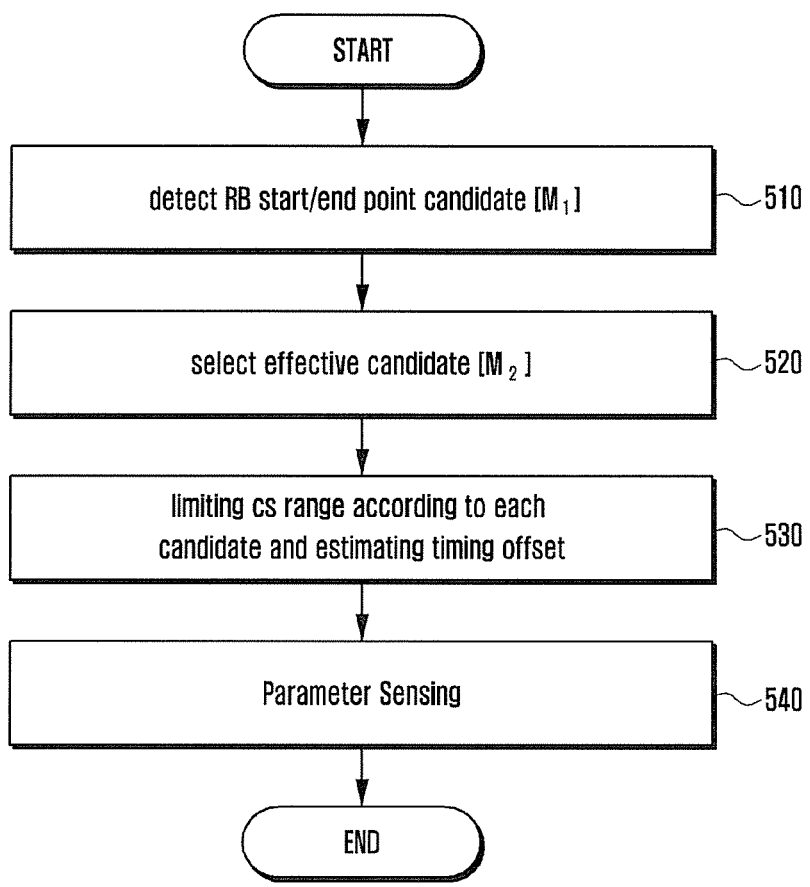
FIG. 5 is illustrates an example flowchart of blind inter-cell interference (BIS) procedure according to the present disclosure.

FIG. 5 illustrates an example flowchart of blind inter-cell interference (BIS) procedure according to the present disclosure;

As illustrated in FIG. 5, before performing full search-based sensing, a BIS performed according to a scheme for reducing an available search space through three steps.

That is, in at step 510, the base station estimates a candidate of a start point index and a candidate of an end point index of the RB acting as interference in received data, that is, a candidate of a start index and a candidate of an end index of the RB acting as interference. According to the present disclosure, an M1 start point candidates and an M1 end point candidates of the interference RB is estimated.

Thereafter, at step 520, the base station selects at least one effective candidate from the start point candidates and the end point candidates of the interference RB estimated in step 510. At this time, the base station selects an effective candidate from the start point candidates and the end point candidates of the interference RB estimated in step 510 associated with allocation information on the LTE uplink RB. Thus, the base station selects an effective candidate of the RB acting as interference.

Subsequently, at step 530, the base station estimates at least one cyclic shift (CS) and timing offset according to each effective candidate of the RB acting as interference which is selected in step 520. At this time, with respect to each of the interference RB candidates selected in step 520, the base station may correct received DM-RSs based on CS and timing offset values, and estimate the CS and the timing offset according to each interference RB candidate through a reverse auto-correlation of the corrected DM-RSs.

Thereafter, at step 540, the base station finally determines at least one group index (U), a CS, an RB size, and an RB offset through parameters sensing. At this time, the base station generates a DMRS for an available combination of the group index (U) and the CS according to each interference RB candidate and perform a cross-correlation on the generated DMRS and the received DMRS, so as to determine a set of at least one of U, a CS, an RB size, and an RB offset having a highest value.

Hereinafter, each step will be described in detail.

Figure 6:
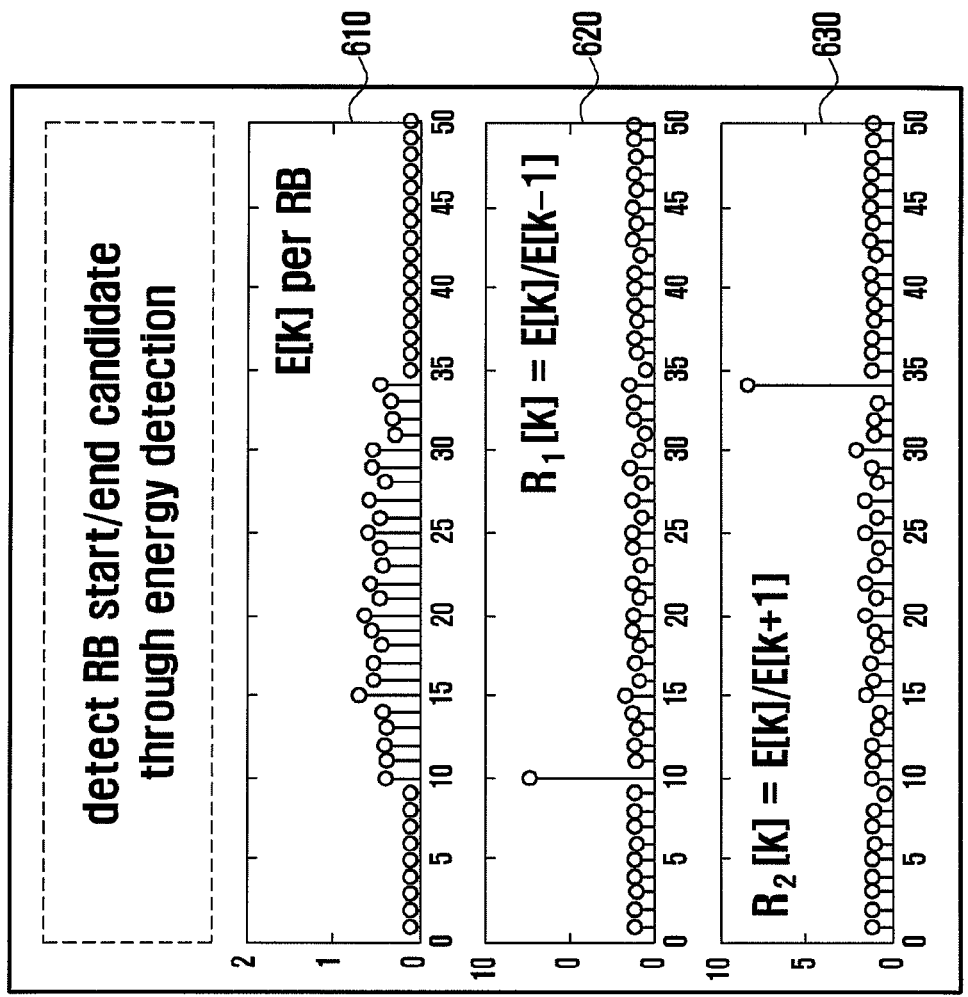
FIG. 6 illustrates an example diagram of estimating a start point candidate and an end point candidate of the RB according to the present disclosure.

FIG. 6 illustrates an example diagram of estimating a start point candidate and an end point candidate of the RB according to the present disclosure;

As described above, the base station estimates the candidate of the start point and the candidate of the end point of the RB acting as interference in the received data, that is, the candidate of the start index and the candidate of the end index of the RB acting as interference. In this case, the base station estimates the candidate of the start index and the candidate of the end index of the interference RB acting as interference by calculating energy per RB.

As illustrated in FIG. 6, as indicated by a reference numeral 610, the base station calculates energy E[k] per RB by using received data or some of the received data. At this time, a number of k values is equal to a number (NRB) of total RBs ($0 \leq k \leq NRB-1$). Furthermore, according to some embodiments, the data received by the base station is frequency domain received data and/or a frequency domain received DM-RS. At this time, a number of pieces of data received by the base station is a value generated by multiplying the number of total RBs (NRBs) by the number of subcarriers per RB (NSCRBs), a number ((NDSSF) of data symbols per subcarrier, and the number (NRX) of reception antennas (NRB*NSCRB×NDSSF×NRX) or a value generated by multiplying the number (NRB) of total RBs by the number (NSCRB) of subcarriers per RB, the number (NRSSF) of DM-RS symbols per subcarrier, and the number (NRX) of reception antennas (NRB*NSCRB×NRSSF× NRX).

Thereafter, the base station calculates an energy ratio of each RB to an adjacent RB as indicated by reference numerals 620 and 630. That is, the base station calculates a forward energy ratio by comparing energy of each RB with energy of an RB, which is cyclic right before the corresponding RB and calculate a backward energy ratio by comparing energy of each RB with energy of an RB which is cyclic right after the corresponding RB. This is expressed as equation (1) and equation (2) below.

$$R_1[k]=E[k]/E[k-1 \bmod N_{RB}] \quad (1)$$

$$R_2[k]=E[k]/E[k+1 \bmod N_{RB}] \quad (2)$$

The base station selects the start index candidate of the RB acting as interference by using a forward energy ratio according to each RB calculated based on equation (1) above. Furthermore, the base station selects the end index candidate of the RB acting as interference by using a backward energy ratio according to each RB calculated based on equation (2) above.

For example, as indicated by reference numeral 620 of FIG. 6, the forward energy ratio R1[k] according to each RB has a large value in a point where energy E[k] per RB rapidly changes compared to energy E[k−1] of the previous RB. The point is the start point candidate of the RB acting as interference. Similarly, as indicated by reference numeral 630 of FIG. 6, the backward energy ratio R2[k] according to each RB has a large value in a point where energy E[k] per RB rapidly changes compared to energy E[k+1] of the following RB.

At this time, according to some embodiments, M1 start point candidates and M1 end point candidates of the interference RB are selected in an order of the size. That is, M1 values are selected, as the start point candidates of the interference RB, from values of the forward energy ratio R1[k] according to each RB in an order of the size. Furthermore, M1 values are selected, as the end point candidates of the interference RB, from values of the backward energy ratio R2[k] according to each RB in an order of the size. At this time, the selection is performed such that the number of start point candidates of the interference RB is different from the number of end point candidates of the interference RB. However, for the convenience of the description, the number of selected start point candidates of the interference RB and the number of selected end point candidates of the interference RB are equally M1 according to the present disclosure.

Considering a resource allocation method in the LTE uplink, a pair of an effective start point candidate and end point candidate is limited within the estimated start point candidates and end point candidates of the interference RB.

More specifically, in a case of LTE, an uplink RB allocation method corresponds to 2×1*3×2*5×3. That is, LTE uplink RB allocation is performed only in the form of a product of the exponent of 2, 3, and 5, and the RB size is not a multiple of a prime number larger than 5. Furthermore, the start point index and the end point index of the interference RB is not the same and the start point index does not exist after the end point index. Accordingly, based on such a fact, a pair of an effective start point candidate and end point candidate is limited within the estimated start point candidates and end point candidates of the interference RB.

For example, three start point candidates and three end point candidates of the interference RB (that is, M1=3) are selected. In this case, start point candidate indices are 2, 7, and 27, and end point candidate indices are 5, 9, and 35. An available combination of the start point and end point candidates is a total of 9 (=M1*M1) including (2, 5), (2, 9), (2, 35), (7, 5), (7, 9), (7, 35), (27, 5), (27, 9), and (27, 35). However, as described above, the RB allocation is performed with only multiples of 2, 3, and 5 in the LTE uplink, so that effective combinations are only (2, 5), (2, 9), (7, 9), and (27, 35). That is, in a case of the combination (2, 5), the RB size is 4, so that the combination is possible. In a case of the combination (2, 9), the RB size is 8, so that the combination is also possible. However, in a case of the combination (2, 35), the RB size is 34, which is a multiple of 17, so that the combination is not possible according to an RB allocation rule. As described above, when the start point candidate indexes are 2, 7, and 27 and the end point candidate indexes are 5, 9, and 35, actually effective combinations of the start point candidates and the end point candidates are only (2, 5), (2, 9), (7, 9), and (27, 35).

According to the present disclosure, in order to increase performance, a combination having a first point of the total RBs as the start point and an end point of the total RBs as the end point are added during such a process. For example, a system having a bandwidth of 10 MHz, (1, 50) is added.

Through such a method, the base station selects M2 combinations of the start point and end point candidates of the interference RB.

Figure 7:
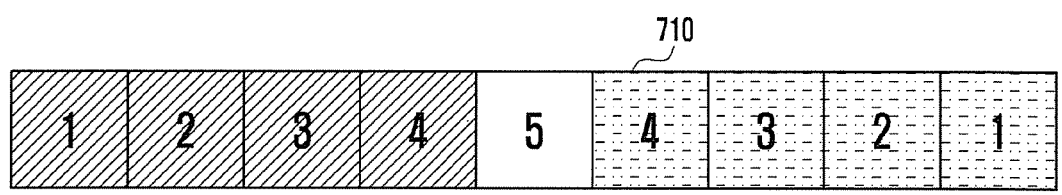
FIG. 7 illustrates an example configuration of the Zadoff-Chu sequence according to the present disclosure.

FIG. 7 illustrates an example configuration of the Zadoff-Chu sequence according to the present disclosure.

A DMRS sequence of the LTE uplink is configured as equation (3) below.

$$r_{u,v}^{(\alpha)}(n)=e^{j\alpha n}\bar{r}_{u,v}(n),\ 0 \leq n \leq M_{sc}^{RS} \qquad (3)$$

In equation (3), MSCRS (1≤m≤NRBmax,UL) denotes a length of the DMRS sequence and MSCRS=m*NSCRB. NSCRB denotes the RB size indicated by the number of subcarriers in a frequency domain, and NRBmax, UL denotes a maximum value of an uplink bandwidth indicated by a multiple of NSCRB. The a denotes a cyclic shift (CS) value and α=2πmCS/12. Furthermore, U denotes a group index and U∈{0, 1, . . . , 29} and v denotes a base sequence index within the group. v has 0 and 1 when MSCRS is larger than or equal to 72, and has 0 in the remaining cases.

When MSCRS is larger than or equal to 3NSCRB, the base sequence is configured as equation (4) below.

$$\bar{r}_{u,v}(n)=x_q(n\ \mathrm{mod}\ N_{ZC}^{RS}),\ 0 \leq n < M_{sc}^{RS} \qquad (4)$$

When MSCRS is smaller than 3NSCRB, the base sequence is configured as equation (5) below.

$$\bar{r}_{u,v}(n)=e^{j\phi(n)\pi/4},\ 0 \leq n \leq M_{sc}^{RS}-1 \qquad (5)$$

In equation (5), q denotes a root index of the Zadoff-Chu (ZC) sequence, and NZCRS denotes a length of the ZC sequence and includes a maximum prime number smaller than MSCRS. φ(n) is given in 3GPP TS 36.211 specification.

The ZC sequence having a root index q is defined by equation (6) below.

$$x_q(m) = e^{-j\frac{\pi qm(m+1)}{N_{ZC}^{RS}}},\ 0 \leq m \leq N_{ZC}^{RS}-1 \qquad (6)$$

In equation (6), q is given by equation (7) below.

$$q=\lfloor \bar{q}+\frac{1}{2} + v \cdot (-1)^{\lfloor 2\bar{q} \rfloor} \rfloor$$

$$\bar{q}=N_{ZC}^{RS} \cdot (u+1)/31 \qquad (7)$$

Among qs according to equation (7), 30 or 60 values are selected from q values and used.

The ZC sequence has, for example, a centric symmetry characteristic as indicated by reference numeral 710 of FIG. 7. This is expressed by equation (8) below.

$$x_q(m)=x_q(N_{ZC}^{RS}-1-m) \qquad (8)$$

Based on the centric symmetry characteristic of the ZC sequence, a search space is further limited.

Specifically, the base station firstly set candidate values ($S_{TO}$) of timing offset to be corrected and candidate values ($S_{CS}$) of cyclic shift (CS) to be corrected.

At this time, all available timing offset samples are selected as the candidate value ($S_{TO}$) of the timing offset to be corrected. For example, the candidate values ($S_{TO}$) of the timing offset to be corrected are set to $[-N_{MAX}^{TO}, -N_{MAX}^{TO}+1, \ldots, N_{MAX}^{TO}-1, N_{MAX}^{TO}]$. According to the present disclosure, the candidate value ($S_{TO}$) of the timing offset to be corrected is not set to include all the available timing offset samples in consideration of performance/complexity trade-off. For example, the candidate values ($S_{TO}$) of the timing offset to be corrected are set to alternately like $[-N_{MAX}^{TO}, -N_{MAX}^{TO}+2, \ldots, N_{MAX}^{TO}-2, N_{MAX}^{TO}]$ or $[-N_{MAX}^{TO}+1, -N_{MAX}^{TO}+3, \ldots, N_{MAX}^{TO}-3, N_{MAX}^{TO}-1]$. Of course, the number of timing offset candidate values ($S_{TO}$) to be corrected is further reduced.

The candidate values ($S_{CS}$) of the cyclic shift (CS) to be corrected are configured as a set of 6 numbers between 0 and 11, the 6 numbers having different remainders when being divided by 6. For example, as the candidate values ($S_{CS}$) of the cyclic shift (CS) to be corrected, only half of the available CS values is selected in an ascending order or a descending order in consideration of the ZC sequence characteristic. For example, when a CS range is 0 to 11, the candidate values ($S_{CS}$) of the cyclic shift (CS) to be corrected are be set to [0, 1, 2, 3, 4, 5], [6, 7, 8, 9, 10, 11], [0 7 2 9 4 5], or the like. When the $S_{CS}$ is set as described above, the same performance as that when the $S_{CS}$ is set as [0, 1, 2, 3, 4, 5, 6, 7, 8, 9, 10, 11] is acquired due to the ZC sequence characteristic. Of course, the number of candidate values ($S_{CS}$) of the CS to be corrected is further reduced.

Hereafter, for convenience of the description, an example is described in which a maximum value ($N_{MAX}^{TO}$) of the available timing offset is ±8 sample and the CS range is 0 to 11, and accordingly, the timing offset candidate values ($S_{TO}$) to be corrected are set as eight values such as [−7, −5, −3, −1, 1, 3, 5, 7] and the candidate values ($S_{CS}$) of the CS to be corrected are set as six values such as [0, 1, 2, 3, 4, 5].

As described above, after setting the timing offset candidate values ($S_{TO}$) to be corrected and the candidate values ($S_{CS}$) of the cyclic shift (CS) to be corrected, the base station corrects the received DMRS corresponding to each of the combinations of the effective start point and end point candidates of the interference RB selected in step 520 by using a combination of the timing offset candidate values and the CS candidate values ($S_{TO}$, $S_{CS}$). For example, in a case of the above example, based on 48 (=8*6) correction candidate combinations corresponding to combinations of 8 timing offset candidate values ($S_{TO}$) and 6 CS candidate values ($S_{CS}$), the received DM-RS corresponding to each of the $M_2$ combinations (in the above described example, 4 combinations such as (2, 5), (2, 9), (7, 9), and (27, 35)) of the effective start point and end point candidates of the interference RB are corrected.

Thereafter, the base station performs the reverse auto-correlation on each of the corrected DM-RSs by using the centric symmetry characteristic of the ZC sequence shown in equation (8) above. At this time, since the DMRS is cyclic-extended, the base station firstly finds an end point of the ZC sequence. For example, referring to FIG. 8, the DMRS in a case where the RB size is 3 is illustrated. In this case, a length ($N_{ZC}$) of the ZC sequence is a maximum prime number smaller than (end point of interference RB−start point of interference RB+1)*number of subcarriers per RB ($N_{SC}^{RB}$) (that is, ($P_{END}-P_{START}+1)N_{SC}^{RB}$).

Figure 8:
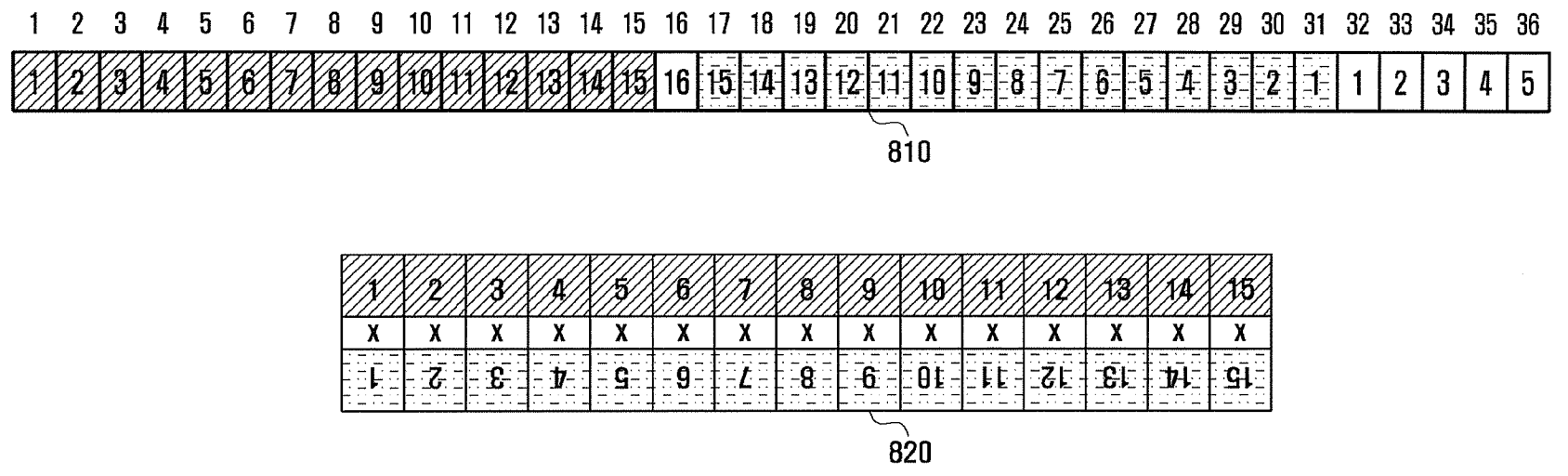

As illustrated in FIG. 8 as an example, since the number of subcarriers per RB is 12 when the RB size is 3, a 31$^{st}$ subcarrier is the end point of the ZC sequence as indicated by reference numeral 810. In this case, the base station performs the auto-correlation on a 1st subcarrier and a 31st subcarrier, a 2nd subcarrier and a 30th subcarrier, . . . , and a 15th subcarrier and a 17th subcarrier based on the symmetry characteristic of the ZC sequence from a 16th subcarrier as indicated by reference numeral 820. According to the present disclosure, when the auto-correlation is calculated, complexity is reduced using some subcarriers of the corrected received DM-RS sequence. For example, the auto-correlation is performed using only a 2nd subcarrier and a 30$^{th}$ subcarrier, a 3$^{rd}$ subcarrier and a 29$^{th}$ subcarrier, . . . , and a 12nd subcarrier and a 20$^{th}$ subcarrier.

Accordingly, with respect to each of the combinations of the effective interference start point and end point candidates of the interference RB, the base station detects the preset number of pairs of CS values and timing offset values in an order of a large reverse auto-correlation (RAC) value. In certain embodiments, some embodiments, for each of the combinations of the effective start point and end point candidates, the base station detects two or more pairs of CS values and timing offset values in an order of size of the RAC value. Hereinafter, for convenience of the description, an example is described in which a pair of one CS value and one timing offset value is detected with respect to the combination of the effective start point and end point candidates of the RB.

For example, DM-RSs received based on 48 combinations of timing offset candidate values ($S_{TO}$) and CS candidate values ($S_{CS}$) are corrected with respect to a first combination ($M_{21}$) of the effective start point and end point candidates of the interference RB, a reverse auto correlation (RAC) is performed on the corrected DM-RSs, and a predetermined number ($M_3$) of pairs of a CS and a timing offset is detected from the 48 RAC values in an order of the size from large to small. Similarly, DMRSs received based on 48 combinations of timing offset candidate values ($S_{TO}$) and CS candidate values ($S_{CS}$) are corrected with respect to a second combination ($M_{22}$) of the effective start point and end point candidates of the interference RB, a RAC is performed on the corrected DMRSs, and a predetermined number ($M_3$) of pairs of a CS and a timing offset is detected from the 48 RAC values in an order of the size from large to small. Similarly, with respect to a third combination ($M_{23}$) and a fourth combination ($M_{24}$) of the effective start point and end point candidates of the interference RB, pairs of a CS and a timing offset are detected. In certain embodiments, the number ($M_3$) of pairs of a CS and a timing offset detected for each candidate are the same or different.

The base station generates a DM-RS sequence with respect to a combination of an available group index (U) and a CS according to each selected RB candidate. At this time, if it is assumed that the base station knows an ID of an adjacent cell, an available U values are also known. For example, under an assumption that the number of adjacent cells is 6 and IDs of all the adjacent cells are known, 6 values of U are possible. Furthermore, in the previous step (that is, step 530), if the corrected values corresponding to half of the entire CS range are used, there are two types of the CS values according to each selected RB candidate. For example, as described in the above example, when the CS range is from 0 to 11 and values from 0 to 6 are set as the CS candidate values, the CS values further includes values generated by adding +6 to the values detected in step 530 as well as the detected values. At this time, when the number of adjacent cells is 6, the number of available U values is 6 and there are two CS values, so that the number of combinations of available U and CS are a total of 12. The base station generates DMRS sequences with respect to the 12 combinations.

Thereafter, the base station calculates a normalized cross-correlation for the received DM-RSs based on the generated DM-RS sequences.

This is expressed by equation (9) below.

$$\bar{C}_{n,k}^{u,cs} = \frac{C_{n,k}^{u,cs}}{12*n} \quad C_{n,k}^{u,cs} = \frac{1}{N_{RX}} \sum_{a=1}^{N_{RX}} C_{n,k,a}^{u,cs} \qquad (9)$$

$$C_{n,k,a}^{u,cs} = \text{abs}(Y_{n,k,a}^* X_n^{u,cs}) \ \{u, cs, n, k\} \in S$$

In equation (9), n denotes an RB size of the selected RB candidate, k denotes an RB offset, U denotes a group index, CS denotes a cyclic shift value, and NRX denotes the number of reception antennas. At this time, the number of generated auto-correlation values (S) is the same as a value generated by multiplying the number (M2) of RB candidates and a combination of available U and CS (according to the above described embodiment, M2*12).

Furthermore, the base station corrects the normalized cross-correlation value based on an average according to each size. This is expressed by equation (10) below.

$$m_n = \frac{1}{N_n} \sum_{k,u,cs} \overline{C}_{n,k}^{u,cs} \overline{C}_{n,k}^{u,cs} = \frac{C_{n,k}^{u,cs}}{m_n} \quad \{u, cs, n, k\} \in S \quad (10)$$

Furthermore, in certain embodiments, when U is calculated, the correction is performed based on an average of cross-correlation values of sequences having several equal U values.

Thereafter, the base station selects NSIC in an order of the size to finally determine at least one group index (U), CS, RB size, and RB offset as shown in equation (11). In certain embodiments, NSIC is 1 or an integer larger than 1.

$$\{\hat{u}, \hat{cs}, \hat{n}, \hat{k}\} = \underset{u,cs,n,k}{\operatorname{argmax}}(\overline{C}_{n,k}^{=u,cs}) \quad (11)$$

Figure 9:
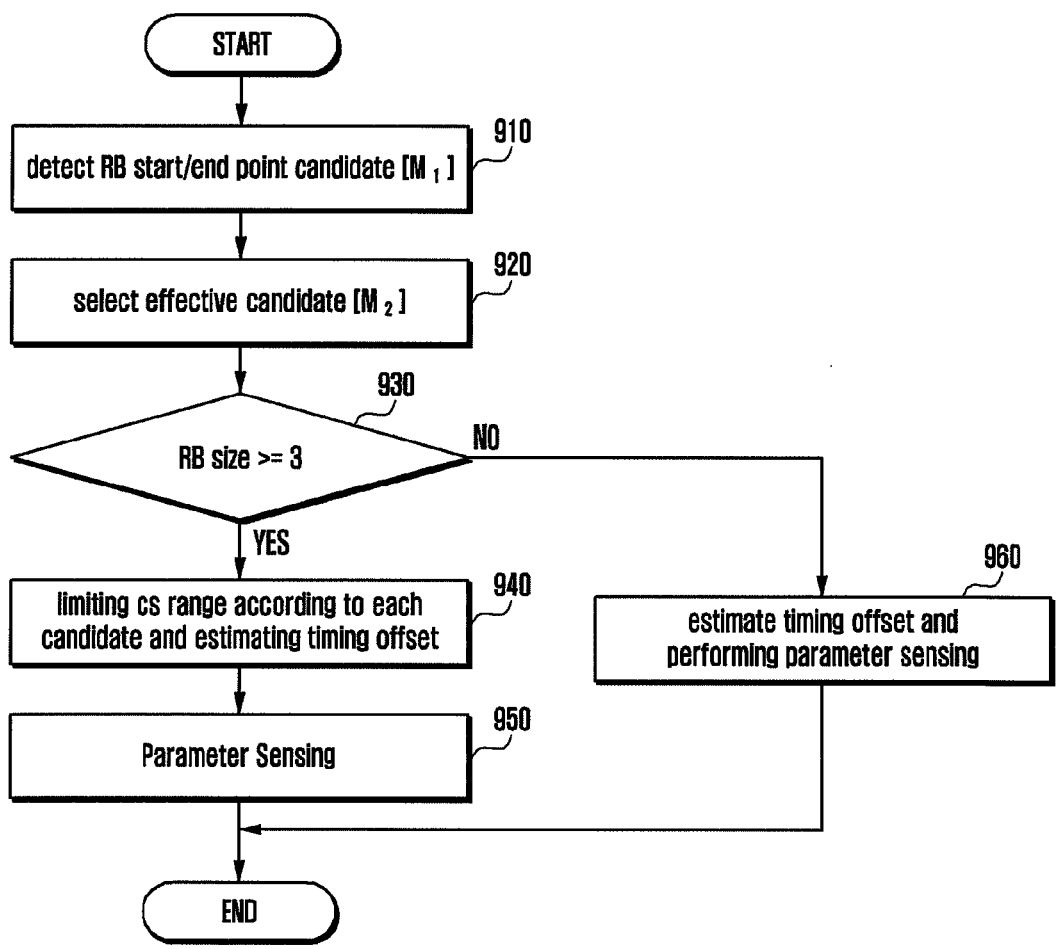
FIG. 9 is a flowchart illustrating a process of BIS according to another embodiment of the present disclosure.

FIG. 9 is a flowchart illustrating a process of BIS according to another embodiment of the present disclosure.

As illustrated in FIG. 9, at step 910, a base station estimates a candidate of a start point and a candidate of an end point of the RB acting as interference in received data, that is, a candidate of a start index and a candidate of an end index of the RB acting as interference. At this time, according to some embodiments, M1 start point candidates and M1 end point candidates of the interference RB are estimated. Since the content is similar to step 510 of FIG. 5 described above, a detailed description thereof will be omitted.

Thereafter, at step 920, the base station selects at least one effective candidate from the start candidates and end candidates of the interference RB estimated at step 910. At this time, the base station selects an effective candidate from the start point candidates and end point candidates of the interference RB estimated at step 910 by using allocation information of the LTE uplink RB. That is, the base station selects an effective candidate of the RB acting as interference. Since the content is similar to step 520 of FIG. 5 described above, a detailed description thereof will be omitted.

At step 930, the base station determines whether the size of the selected effective interference RB candidate is larger than or equal to 3.

When the RB candidate size is larger than or equal to 3 based on a result of the determination in step 930, the base station estimates, at step 940, at least one cyclic shift (CS) and timing offset according to each effective candidate of the RB acting as interference selected at step 920. At this time, with respect to each of the interference RB candidates selected in step 920, the base station corrects a received DMRS based on CS values and timing offset values, and estimate the CS and the timing offset according to each interference RB candidate by performing the reverse autocorrelation on the corrected DM-RS. Since the content is similar to step 530 of FIG. 5 described above, a detailed description thereof will be omitted.

Thereafter, at step 950, the base station finally determines at least one group index (U), CS, RB size, and RB offset through parameter sensing. At this time, the base station generates a DM-RS for an available combination of the group index (U) and the CS according to each interference RB candidate and perform a cross correlation on the generated DM-RS and the received DM-RS, so as to determine a set of at least one of U, CS, RB size, and RB offset having a highest value. Since the content is similar to step 540 of FIG. 5 described above, a detailed description thereof will be omitted.

When the RB candidate size is smaller than 3 based on a result of the determination in step 930, the base station performs timing offset estimation and parameter sensing at step 960.

More specifically, the base station firstly sets candidate values (STO) of the timing offset to be corrected. At this time, all available timing offset samples are selected as the candidate value (STO) of the timing offset to be corrected. For example, the candidate values (STO) of the timing offset to be corrected are set as [−NMAXTO, −NMAXTO+1, . . . , NMAXTO−1, NMAXTO]. According to some embodiments, the candidate value (STO) of the timing offset to be corrected is not set to include all the available timing offset samples in consideration of performance/complexity trade-off. For example, the candidate values (STO) of the timing offset to be corrected is set alternately like [−NMAXTO, −NMAXTO+2, . . . , NMAXTO−2, NMAXTO] or [−NMAXTO+1, −NMAXTO+3, . . . , NMAXTO−3, NMAXTO−1]. Of course, the number of timing offset candidate values (STO) to be corrected is further reduced.

Thereafter, the base station generates a DMRS sequence with respect to a combination of the selected timing offset candidate value, available U (group index), and CS value according to each selected RB candidate. At this time, the number of DM-RS sequences generated according to each RB candidate is NuNCS|STO|.

Furthermore, the base station calculates a normalized correlation for the received DMRS based on the generated DM-RS sequences.

This is expressed by equation (12) below.

$$\overline{C}_{n,k}^{u,cs,TO} = \frac{C_{n,k}^{u,cs,TO}}{12 * n} \quad C_{n,k}^{u,cs,TO} = \frac{1}{N_{RX}} \sum_{a=1}^{N_{RX}} C_{n,k,a}^{u,cs,TO} \quad (12)$$

$$C_{n,k,a}^{u,cs,TO} = \operatorname{abs}(Y_{n,k,a}^* X_n^{u,cs,TO}) \quad (u, cs, n, k, TO) \in S'$$

At this time, n denotes an RB size of the selected RB candidate, k denotes an RB offset, U denotes a group index, CS denotes a cyclic shift value, TO denotes a timing offset value, and NRX denotes the number of reception antennas. At this time, the number of generated auto-correlation values (S') is the same as a value generated by multiplying the number (M2) of RB candidates and a combination of available U, CS, and timing offset values (according to the above described embodiment, M2*NuNCS|STO|).

Furthermore, the base station corrects the normalized cross correlation value based on an average according to each size. This is expressed by equation (13) below.

$$m_n = \frac{1}{N_n} \sum_{k,u,cs,TO} C_{n,k}^{u,cs,TO} \overline{C}_{n,k}^{u,cs,TO} \frac{\overline{C}_{n,k}^{u,cs,TO}}{m_n} \quad (u, cs, n, k, TO) \subset S' \quad (13)$$

Thereafter, the base station selects NSIC in an order of the size to finally determine at least one group index (U), CS, RB size, and RB offset as shown in equation (14). According to some embodiments, NSIC is 1 or an integer larger than 1.

$$\{\hat{u}, \hat{CS}, \hat{n}, \hat{k}, \hat{TO}\} = \underset{u,cs,n,k,TO}{\mathrm{argmax}}\left(\overline{C}_{n,k}^{u,cs,TO}\right) \quad (14)$$

Meanwhile, in certain embodiments, when the cross correlation is calculated, complexity is reduced using some elements of the generated DMRS sequences and the received DMRSs. For example, the cross correlation is calculated using only odd-numbered subcarriers such as a 2nd subcarrier, a 4th subcarrier, and a 6th subcarrier, and so on. The performance and complexity of inter-cell interference (ICI) sensing according to the present disclosure are compared to those of sensing based on brute-force as shown in, for example, table 1 below. This corresponds to a result in an environment of a bandwidth (BW) 10 MHz, Ped. B+AWGN channel, six interference cells (cell IDs are known), three interferences (INR: 8.3, 2.3, −1.6 dB) (such as interference size, offset, and CS thereof are random, and U values of the interferences do not overlap each other), perfect desired DM-RS cancellation, +8 timing offset sample, M1=3, and NSIC=3.

TABLE 1

|  | Trivial full search | Advanced full search | Proposed |
| --- | --- | --- | --- |
| 1st choice | 28.4% | 88.4% | 88.3% |
| 2nd choice | 7.6% | 69.7% | 42.3% |
| 3rd choice | 3.1% | 40.9% | 10.8% |
| Adv. # of RB to be correlated | 11,654,928 (100%) | 11,654,928 (100%) | 5,328 (0.046%) |

As illustrated in table 1, the performance according to the present disclosure is similar to the performance according to the brute-force full search-based method, but the complexity according to the present disclosure is very low (approximately 0.046%).

Figure 10:
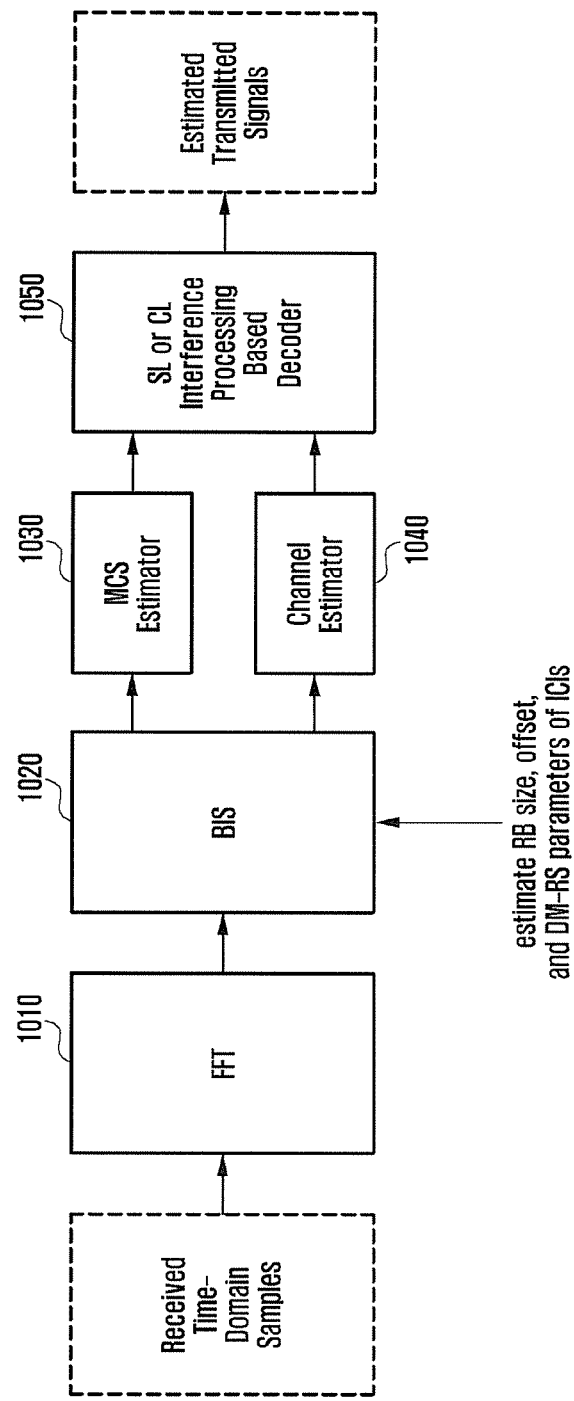
FIG. 10 illustrates an example block diagram of a receiver according to the present disclosure.

FIG. 10 illustrates an example a block diagram of a receiver according to the present disclosure.

As illustrated in FIG. 10, a receiver includes a fast fourier transform (FFT) unit 1010 for transforming received time domain data to frequency domain data and a BIS unit 1020 for blind inter-cell interference (BIS) according to an embodiment of the present disclosure. The BIS unit 1020 estimates an RB size of each ICI, an RB offset, and DM-RS parameters. Since a detailed operation thereof has been described in the part related to FIGS. 5 to 9, a detailed description thereof will be omitted. The receiver further includes an MCS estimation unit 1030 for estimating Modulation and Coding Schemes (MSCs) by using the RB size, the RB offset, and DM-RS parameters of each ICI estimated by the BIS unit 1020 and a channel estimation unit 1040 for estimating a channel. The receiver further includes an interference processing decoder 1050 for performing interference processing according to the estimated MCS and a channel result to output an estimated received signal. Meanwhile, although it has been illustrated that the operations of the receiver are driven by separated components, this is only for convenience of the description and a plurality of components is included in one component. Furthermore, according to some embodiments, the whole operations of the receiver are performed by one controller.

Figure 11:
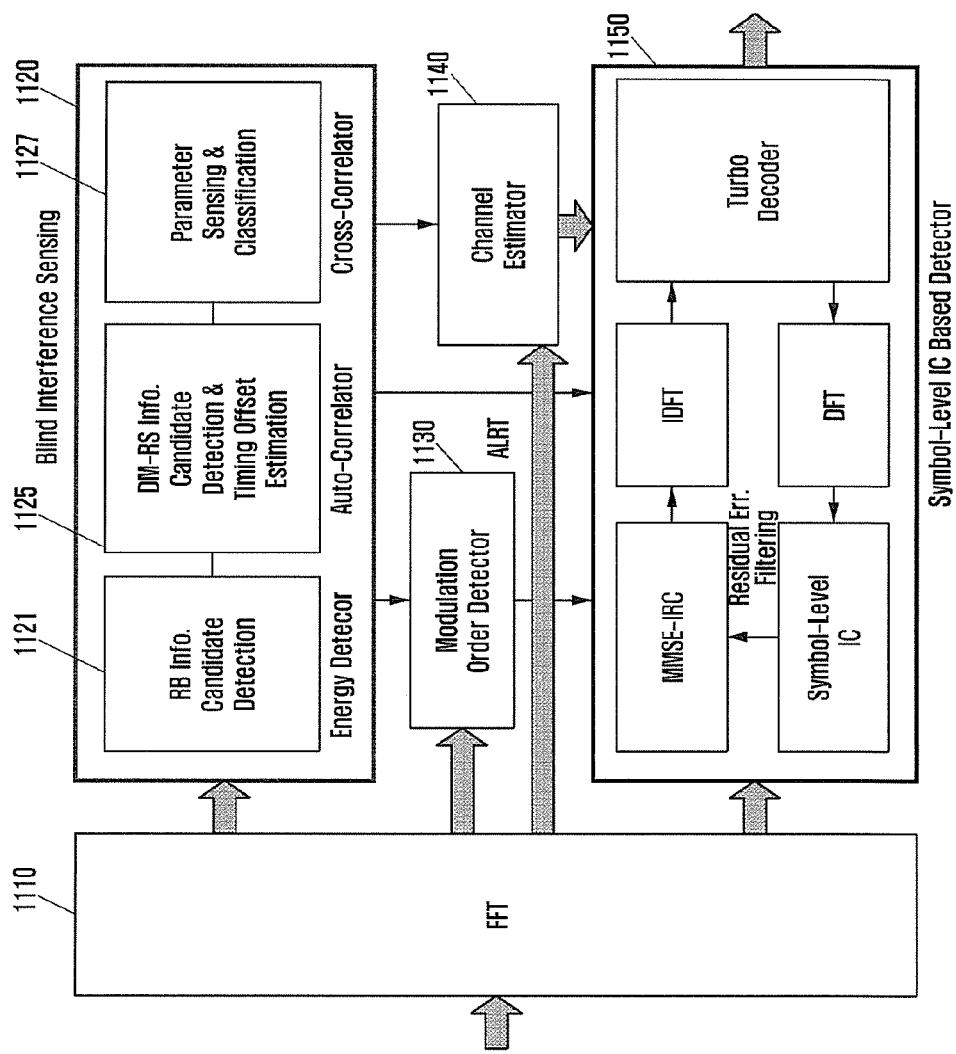
FIG. 11 illustrates another example block diagram of a receiver according to the present disclosure.

FIG. 11 illustrates another example a block diagram of a receiver according to the present disclosure.

As illustrated in 11, the receiver includes a fast fourier transform (FFT) unit 1110 for transforming received time domain data to frequency domain data and a BIS unit 1120 for blind inter-cell interference (BIS) according to an embodiment of the present disclosure. The BIS unit 1120 estimates an RB size of each ICI, an RB offset, and DMRS parameters.

At this time, the BIS unit 1120 includes an RB candidate detection unit 1121, a DM-RS candidate detection and timing offset estimation unit 1125, and a parameter detection and classification unit 1127. The RB candidate detection unit 1121 detects a start point candidate and an end point candidate of the RB acting as interference and select effective interference RB candidates. Further, the DM-RS candidate detect and timing offset estimation unit 1125 estimates CS and timing offset according to each effective interference RB candidate detected by the RB candidate detection unit 1121. Furthermore, the parameter detection and classification unit 1127 finally determine a set of U, CS, RB size, and RB offset by using CS and timing offset information according to each effective interference RB candidate estimated by the DMRS candidate detection and timing offset estimation unit 1125. Since a detailed operation thereof has been described in the part related to FIGS. 5 to 9, a detailed description thereof will be omitted.

The receiver further includes an MCS estimation unit 1130 for estimating modulation and coding schemes (MSCs) by using the RB size, RB offset, and DM-RS parameters of each ICI estimated by the BIS unit 1120 and a channel estimation unit 1140 for estimating a channel. The receiver further includes a symbol level IC-based detection unit 1150 for performing interference processing according to the estimated MCS and a channel result to output an estimated received signal. At this time, the detection unit 1150 includes minimum mean square error-interference rejection and combining (MMSE-IRC), inverse discrete fourier transform (IDFT), turbo decoder, discrete fourier transform (DFT), symbol level interference cancellation (IC).

Meanwhile, although it has been illustrated that the operations of the receiver are driven by separated components, this is only for convenience of the description and a plurality of components are included in one component. Furthermore, according to some embodiment, the whole operations of the receiver are performed by one controller.

Figure 12:
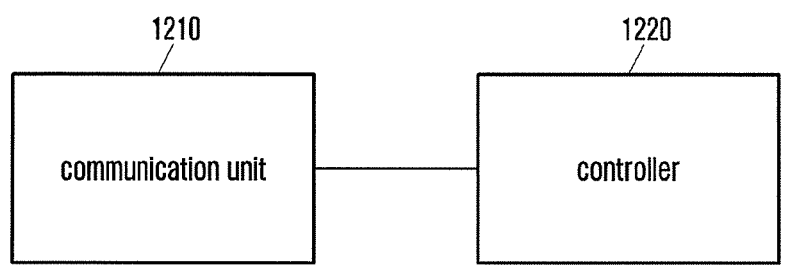
FIG. 12 illustrates an example block diagram of a base station according to the present disclosure.

FIG. 12 illustrates an example block diagram of a base station according to the present disclosure.

As illustrated in FIG. 12, a base station according to an embodiment of the present disclosure includes a communication unit 1210 and a controller 1220 for controlling the general operation of the base station.

The controller 1220 of the base station controls the base station to perform any one operation described in the aforementioned embodiments. For example, the controller 1220 makes a control to receive a signal including a reference signal (RS) from the terminal, to generate at least one interference candidate RS, to calculate cross correlation values of the at least one interference candidate RS and the received RS, to estimate at least one of a size of an interference resource block (RB) acting as interference, interference RB offset, group index (U), and cyclic shift (CS) by using a preset number of interference candidate RSs in an order of a large cross correlation value, and to remove an interference signal by using at least one of the estimated RB size, RB offset, timing offset, and U. Although removing the interference signal is described as an example in the present embodiment, it is noted that the interference signal is directly reduced (direct IRC). Furthermore, the controller 1220 makes a control to detect at least one interference RB candidate, to estimate CS values and timing offset values according to each of the at least one interference RB candidate, and to generate the interference candidate RS based on combinations of the estimated CS values and available U values.

The communication unit 1210 of the base station transmits and receives a signal according to any one operation described in the aforementioned embodiments. For example, the communication unit 1210 transmits and receives a signal including an RS from the terminal.

Figure 13:
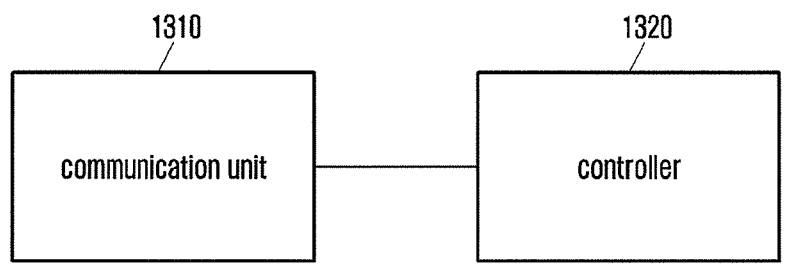
FIG. 13 illustrates an example a block diagram of a terminal according to the present disclosure.

FIG. 13 illustrates an example a block diagram of a terminal according to the present disclosure.

As illustrated in FIG. 13, a terminal according to an embodiment of the present disclosure includes a communication unit 1310 and a controller 1320 for controlling the general operation of a base station.

The controller 1320 of the terminal controls the terminal to perform any one operation described in the aforementioned embodiments. For example, the controller 1320 controls the terminal to transmit a signal including an RS to the base station in an uplink.

Furthermore, the communication unit 1310 transmits and receives a signal according to any one operation described in the aforementioned embodiments. For example, the communication unit 1310 transmits and receives a signal including an RS to the base station.

Meanwhile, although the embodiments of the present disclosure have been described using the DMRS in the above described embodiments, the present disclosure is not limited thereto and the base station acquires the same result through another reference signal. Furthermore, although removing the interference signal is described as an example in the above described embodiments, it is construed as including direct IRC of the interference signal.

Embodiments of the present disclosure disclosed in the specification and the drawings are only particular examples to easily describe the details of the present disclosure and assist in understanding of the present disclosure, and do not limit the scope of the present disclosure. It will be apparent to those having ordinary knowledge in the technical field, to which the present disclosure pertains, that it is possible to practice other modified embodiments based on the technical idea of the present disclosure as well as the embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating by a base station, the method comprising: receiving a reference signal (RS) transmitted from a terminal; generating one or more interference candidate RSs; calculating a cross-correlation value associated with the one or more interference candidate RSs and the received RS; estimating at least one of resource block (RB) sizes, an RB offset of the RB, a group index (U), a timing offset, and a cyclic shift (CS) in accordance with a preset number of interference candidate RSs in an order of a large-cross correlation value, wherein the RB is regarded as an interference originator; removing the interference signal or performing a direct reduction by using the one or more estimated RB sizes, the RB offset, the group index (U), the timing offset, and the cyclic shift (CS).

2. The method of claim 1, wherein the generating one or more interference candidate RSs comprises: detecting one or more interference RB candidates; estimating the CS values and the timing offset values associated with each of the one or more interference RB candidates; and determining the one or more interference candidate RSs in accordance with a combination of the estimated CS and the estimated group index (U).

3. The method of claim 2, wherein the detecting one or more interference RB candidates comprises:
determining an energy of the received signal per RB;
calculating a forward energy ratio, wherein the forward energy ratio comprises an energy of each RB to an RB cyclically right before the RB;
selecting a predetermined number of RBs in an order of the large forward energy ratio associated with the interference RB start index candidates;
calculating a backward energy ratio, wherein the backward energy ratio comprises an each energy of each RB to an RB cyclically right after the RB; and
selecting a predetermined number of RBs in an order of the large backward energy ratio associated with the interference RB end index candidates.

4. The method of claim 2, wherein the detecting one or more interference RB candidates further comprises:
selecting a pair of an effective interference RB start index candidate from the interference RB start index candidates and interference RB end index candidate from the interference RB end index candidates.

5. The method of claim 4, wherein the selecting a pair of an effective interference RB start index candidate and interference RB end index candidate comprises selecting the pair of the effective interference RB start index candidate and interference RB end index candidate in accordance with RB allocation information on an uplink transmission.

6. The method of claim 5, wherein the interference RB start index candidate includes a start index of the whole RB and the interference RB end index candidate includes an end index of the whole RB.

7. The method of claim 2, wherein the estimating the CS values and the timing offset values associated with o each of the one or more interference RB candidates comprises:
setting one or more timing offset candidate values;
setting one or more CS candidate values;
correcting the received RS in accordance with a combination of the timing offset candidate values and the CS candidate values;
calculating a reverse auto-correlation value associated with the corrected and received RS; and
detecting a predetermined number of timing offset candidate values and CS candidate values in an order of a large reverse auto-correlation value associated with each interference RB candidate.

8. The method of claim 7, wherein the setting one or more CS candidate values comprises setting a half of available CS values in an ascending order or a descending order to the one or more CS candidate values.

9. The method of claim 7, wherein the setting one or more timing offset candidate values comprises setting successively selected values at preset intervals from available timing offset values to the timing offset candidate values.

10. The method of claim 7, wherein the calculating a reverse auto-correlation value comprises calculating the reverse auto-correlation value associated with a preset number of elements among totally corrected and received RS sequences.

11. The method of claim 7, wherein the calculating a reverse auto-correlation value associated with the corrected and received RS comprises correcting the cross-correlation value associated with an average of each RB size.

12. The method of claim 1, wherein the RS corresponds to a demodulation reference signal (DM-RS).

13. The method of claim 1, wherein the calculating a cross-correlation value of the one or more interference candidate RS and the received RS comprises calculating the cross-correlation value associated with a preset number of elements among the received RS sequences.

14. A base station comprises: a transceiver configured to transmit a signal to another network entity and to receive a signal from another network entity; and at least one processor configured to; receive a reference signal (RS) transmitted from a terminal, generate one or more interference candidate RSs; calculate a cross-correlation value of the one or more interference candidate RSs and the received RS; estimate at least one of resource block (RB) size, an RB offset of the RB, a group index (U), a timing offset, and a cyclic shift (CS) in accordance with a preset number of interference candidate RSs in an order of a large cross-correlation value, wherein the RB is regarded as an interference originator; remove the interference signal or perform a direct reduction by using the one or more estimated RB sizes, the RB offset, the group of index (U), the timing offset, and the cycle shift (CS).

15. The base station of claim 14, further comprising:
the at least one processor configured to:
detect one or more interference RB candidates,
estimate the CS values and the timing offset values associated with each of the one or more interference RB candidates, and
determine the one or more interference candidate RSs in accordance with a combination of the estimated CS values and the estimated group index (U) values.

16. The base station of claim 14, further comprising:
the at least processor configured to:
determine an energy of the received signal per RB;
calculate a forward energy ratio, wherein the forward energy ratio comprises an energy of each RB to an RB cyclically right before the RB;
select a predetermined number RBs in an order of a large forward energy ratio associated with the interference RB start index candidates;
calculate a backward energy ratio, wherein the backward energy ratio comprises an each energy of each RB to an RB cyclically right after the RB; and
select a predetermined number of RBs in an order of a large backward energy ratio associated with the interference RB end index candidates.

17. The base station of claim 14, further comprising:
the at least one processor configured to:
select a pair of an effective interference RB start index candidate from the interference RB start index candidates and interference RB end index candidate from the interference RB end index candidates.

18. The base station of claim 14, further comprising:
the at least on processor configured to:
select the pair of the effective interference RB start index candidate and interference RB end index candidate in accordance with RB allocation information on an uplink transmission.

19. The base station of claim 18, wherein the interference RB start index candidate includes a start index of the whole RB and the interference RB end index candidate includes an end index of the whole RB.

20. The base station of claim 14, further comprising:
the at least one processor configured to:
set one or more timing offset candidate values;
set one or more CS candidate values;
correct the received RS in accordance with a combination of the timing offset candidate values and the CS candidate values;
calculate a reverse auto-correlation value associated with the corrected and received RS, and
detect a predetermined number of timing offset candidate values and CS candidate values in an order of a large reverse auto-correlation value associated with each interference RB candidate.

21. The base station of claim 14, further comprising:
the at least one processor configured to:
set a half of available CS values in an ascending order or a descending order to the one or more CS candidate values.

22. The base station of claim 14, further comprising:
the at least on processor configured to:
set successively selected values at preset intervals from available timing offset values to the timing offset candidate values.

23. The base station of claim 14, further comprising:
The at least on processor configured to:
calculate the reverse auto-correlation value associated with a preset number of elements among totally corrected and received RS sequences.

24. The base station of claim 14, further comprising:
The at least one processor configured to:
correct the cross-correlation value associated with an average of each RB size.

25. The base station of claim 14, wherein the RS corresponds to a demodulation reference signal (DM-RS).

26. The base station of claim 14, further comprising:
the at least one processor configured to:
calculate the cross correlation value associated with a preset number of elements among the received RS sequences.

* * * * *